Jan. 23, 1968  L. A. SHEAROUSE  3,365,356

BONDED PORCELAIN ARTICLES AND METHOD FORMING SAME

Filed March 23, 1964

INVENTOR.
LEE A. SHEAROUSE

BY

ATTORNEY

United States Patent Office 3,365,356
Patented Jan. 23, 1968

3,365,356
BONDED PORCELAIN ARTICLES AND
METHOD FORMING SAME
Lee A. Shearouse, Wadsworth, Ohio, assignor to The
Ohio Brass Company, Mansfield, Ohio, a corporation
of New Jersey
Filed Mar. 23, 1964, Ser. No. 353,699
10 Claims. (Cl. 161—206)

ABSTRACT OF THE DISCLOSURE

Dry unfired porcelain articles of substantially the same composition are bonded together by covering with polyvinyl alcohol the areas which are to be bonded together, and then bonding these together with a porcelain slip of a composition approaching that of the articles, and then firing. Before firing, the joint may be covered with a paste of porcelain of a composition approaching that of the articles. The product and method are claimed.

This invention relates to the bonding of dry body sections of unfired porcelain. They are treated, processed, and bonded together dry, and the bond after firing forms a true porcelain joint. The invention includes the bonded porcelain articles, as well as the process of bonding.

Long sections of formed ceramic bodies are sometimes difficult to produce and handle in the plastic or workable state. This is particularly true of long cylindrical insulators and the like. The invention relates particularly to the bonding together of such long sections, but includes also the bonding of other dry porcelain articles.

According to this invention, short sections or portions, such as short tubular sections of dry porcelain articles, are bonded together to build up a desired composite such as a tubular insulator of predetermined height. Such bonded products after firing have substantially the same strength at the bond as in any other portion of the product.

The process of slip joining is well known in the trade and has been used many years for bonding plastic porcelain articles together for the production of porcelain products. In this process the plastic sections have been joined together at a proper stage of their drying in order to develop a bond with sufficient strength to resist strains set up as a result of continued drying, as well as firing. A slip which is usually a mixture of the body composition with water, has served as the joining medium. The exact conditions necessary to produce a good slip joint cannot be well defined or controlled, and it is normally difficult to produce a joint which, before and after firing, has the desired characteristics.

Another method of bonding which has been employed is called glaze joining. It is often used to bond together sections which have ordinarily already been fired once and which are coated with glaze material which on a second firing bonds the fired sections together. The fired glazed joint often contains bubbles and blisters formed by volatilization of gases from the glaze composition during firing which reduce the mechanical and electrical strength of the joint.

According to this invention, unfired dry porcelain sections of substantially the same composition are bonded together to produce a joint with properties which after firing are similar to those sections of the product which contain no joint. Carefully controlled drying of the bond such as that necessary in the slip-joining processes is not required. The structure of the bond is usually more uniform in composition than that prepared by glaze joining, and should contain very few voids, if any.

The description of the new process follows.

The surface of the dry porcelain articles which are to be joined are finished preferably by machining, so that they mate without the formation of large voids. Loose particles on the machined surfaces are removed. This is advantageously done first with an air blast and then by applying an adhesive-type tape or coating to the surface which is subsequently stripped. Loose particles which would act as flaws in the finished joint adhere to the tape or coating and thereby are removed when the tape or coating is stripped from the bonding surfaces.

A dried clay or porcelain article has the capacity to absorb a considerable quantity of water, and this causes expansion of the article and weakening of any bond formed with it. Consequently the bond has not the desired strength. If the article becomes sufficiently wet a slaking action occurs which can eventually cause disintegration of the shape. Because the process of the invention involves applying water-containing suspensions to the machined bonding surfaces, and some penetration of the bonding surfaces by the aqueous phase of the suspension is required to obtain a good bond although excessive penetration is to be avoided, the degree of water absorption at these surfaces is limited by applying a dry-body-penetrating water-permeable membrane or film over each bonding surface. The water of the slip used for bonding permeates this membrane but the membrane prevents any deterioration in the soundness of the dry porcelain article by slaking, etc.

The preferred membrane material penetrates into the machined face of the dry porcelain article and forms a firm bond with it. It must be water-permeable to permit the slip used for bonding to permeate it to a limited extent and enter the dry porcelain article so that on subsequent firing a strong bond is formed. The membrane is an organic composition and on firing it disappears. The preferred film-forming agent is polyvinyl alcohol, and more particularly that known commercially as Elvanol 70–05 which is sold by E. I. du Pont de Nemours and Company. It has a viscosity of 4 to 6 centipoises as determined on a 4-percent water solution at 20° C., by the Hoeppler Falling-Ball Method. It has a pH of 6 to 8 and on heating the ash does not exceed 1 percent. The hydrolysis value is 99 to 100 percent. The dry Elvanol powder is dissolved in hot water and is applied in a solution of less than about 5 percent, and preferably between about .05 to 4 percent. The structure of the dry article and the time in which the bond is to be formed will determine to some extent the preferred concentration of the aqueous polyvinyl alcohol. It should penetrate the bonding face of the dry article sufficiently to form a firm bond with it because there is a capillary-membrane activity which results in the water from the joining slip passing into the article. The movement of water into the capillaries of the dry article when covered with membrane tends to knit the partially dehydrating joining slip to the bonding surface of the dry articles. This physical interlocking gives the bond its initial dry strength which is necessary because the bonded sections must be handled as one unit to some extent prior to being fired.

Controlled penetration results in a permissible amount of reaction of the joining slip water with the dry bodies. If there is too much penetration of the dry body by the slip water, the bonding surfaces are weakened by water swelling or slaking. The membrane prevents this. On the other hand, the joining slip must dehydrate enough to have sufficient body required for the act of joining. If there is not sufficient water, water passage into the dry article is difficult and time-consuming. Thus, there must be sufficient water present and the membrane must be sufficiently pervious to effect penetrating reaction of the joining slip with the membrane over the bonding surface. Excessive solution of the joining slip by the polyvinyl alcohol weakens the final bond during firing. Only very small concentrations of the polyvinyl alcohol should be added directly to the body slip, and curdling and/or foaming or both are to be avoided.

Depth of penetration of the water into the dry article varies with the temperature of each component. Generally, the higher the temperature, the more the penetration. The dry density of the bonding surface, which can vary with such factors as the method of forming and the body composition itself, can regulate the penetration to some extent. Also, the length of time that the dry bonding surface is in contact with the polyvinyl solution can control penetration. The concentration of the membrane solution itself can shift the penetration depth, provided other factors are considered. The depth of the penetration may, for example, be from about 1/64 to 1/32 inch.

The polyvinyl alcohol solution is applied to both of the bonding surfaces, usually at room temperature, as by dipping, spraying or brushing. The number of applications can be varied as desired, although a very thin layer is all that is required and is preferred. The thickness of the polyvinyl alcohol membrane is kept at a minimum because during subsequent firing the polyvinyl alcohol is vaporized and/or oxidized away, leaving only a trace of ash dust which has no bond-separation characteristics. The joining slip layer, when dried, and before firing, may be about 1/32 inch thick, for example. The presence of a thick membrane of polyvinyl alcohol would tend to form voids in the bond on firing, and the upper dry article may tend to slip on the lower dry article making an acceptable mating of the two bodies difficult.

The joining slip or slurry is usually made mostly from the same composition as the dry articles, although this is not essential. Some variance is possible but close simulation is desired so that both the bond and the dry articles will have the same expansion and contraction properties when heated and cooled during and after firing. Also, if the bond and dry articles are of substantially the same composition the bond formed is likely to be stronger than otherwise.

The joining slip is ground and screened to reduce the flaw population and to enhance the dry and fired properties of the product. The water content of the slurry is adjusted to about 40 to 60 percent of the dry weight of the slurry. The dry material added to the slurry is advantageously finer than 325 mesh, and may be somewhat coarser or finer. The presence of large particles in the slip tends to reduce the strength of the bond.

It is desirable to add a refractory ceramic fiber to the bond. A preferred material is Fiberfrax, a fine ceramic fiber produced by The Carborundum Company. (See Light-weight Fiberfrax Insulation Defies Searing Heat in the 2300° F. Range in Fiberfrax Ceramic Fiber by The Carborundum Company, Niagara Falls, N.Y., March 1960.) The individual fibers may range from a submicron diameter to a diameter of about 10 microns—a preferred mean being about 2 to 3 microns. The fibers are short—generally measuring less than about 1/2 inch, although in any batch they may vary appreciably in length and also in diameter. They are not long enough to curl and mat in the bond, but are generally straight and finally lie substantially parallel to the mating surfaces as a part of the joining slip. They increase the body of the bond when wet, making it easier to handle and less apt to run. Furthermore, when pressure is applied they reduce extrusion of the bond from between the dry articles which are being bonded together. Several percent of fiber are advantageously used, the weight being in the neighborhood of 1 to 10 percent or more, based on the weight of the dry material.

The bond between the dry articles is preferably of uniform thickness and usually covers the whole area between the bonded surfaces.

Because of the extreme thinness of the bonding layer, it is desirable to remove non-fibrous material from the fibers, such as small particles of glass, etc. This is advantageously done by floating the fibers off in a body of water in which the non-fibrous particles sink to the bottom. After such separation the fibers are dried, inspected and weighed before being added to the slip. They are compounded with the slip by blunging, i.e. mixing them with the slurry by paddles, blades or the like. It is then desirable to submit the product to a short grinding operation, as in a ball mill, to thoroughly disperse the ceramic fibers in the slurry and reduce the viscosity of the material. This is preferable to ball milling without prior blunging, because before the very light, low-density fiber is satisfactorily dispersed in a ball mill an excessive amount of the fiber has lost is characteristic fiber shape. The fibers are not long enough to become intertwined in the bond but are present as discrete components. The presence of the fibers greatly reduces the possibility of cracking during the drying and firing of the bonding slip after mating the dry article sections. In firing, the fibers soften and bond to the ceramic material in the slip, but do not entirely lose their shape. They reduce the amount of disruptive flaws which may develop because of the anomalous structure of the sections joined during firing, and this structure may cause irregular shrinkage during firing.

The slip is usually applied to the bonding surfaces by spraying, dipping or light brushing. As these surfaces which are coated with the polyvinyl alcohol membrane are being covered with the slip, there is a partial dehydration of the slip as its water moves through the polyvinyl alcohol membrane into the dry articles. The membrane retains the shape of the dry articles, and prevents their deformation.

The slip-coated bonding surfaces are brought together in a mating action which requires the application of gradually increasing pressure to avoid entrapment of air and excessive flow of the partially dehydrated slip. The final maximum bonding pressure will vary.

It is desirable, particularly when large surface areas are bonded together to form a collar of the slip over the edge of the bond. This collar overlaps the surfaces of the dry articles adjacent the bond which are preferably precoated with polyvinyl alcohol solution for the reasons mentioned. This collar is formed of a paste which contains about 1 to 2 parts of water to 2 parts of the dry material. The collar may or may not include fibers, whether or not there are fibers in the bond. The collar prevents the edge of the bond from drying too rapidly and cracking. It may be removed after complete drying and prior to glazing and firing. On the other hand it may be left intact during firing, particularly on larger pieces where the bulge formed is not objectionable, to improve the bond and the strength of the bonded article.

Glaze is usually applied before firing. The bonded product is then gradually heated to firing temperature.

Glazed and fired bars 3/4 inch in diameter were subjected to a cross-bending test to determine the modulus of rupture. Such samples normally show about 15,000 p.s.i. for the modulus of pressure. If such a test bar is cut when dry across the longitudinal axis, and the two halves are bonded by the process of this invention, including fibers in the slip, and using a bond of the thickness described, the strength of the glazed piece after firing is in the range of 13,500 to 14,000 p.s.i.

The described process lends itself particularly to the building up of large pothead insulator housings which are so tall that it is difficult to make them all in one piece by the extrusion process. Such a technique may also be used in the manufacture of lightning arrester housings and large bushings, etc.

The invention is further described in connection with the accompanying drawings, in which.

Figure 1:
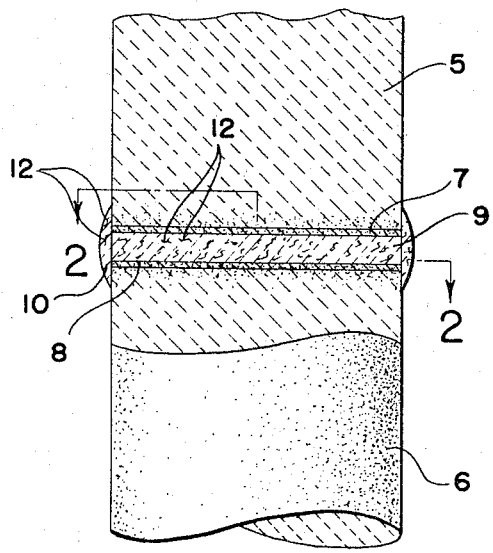
FIGURE 1 is an elevation of two dry porcelain articles bonded together, partly in section to better illustrate the structure.
Figure 2:
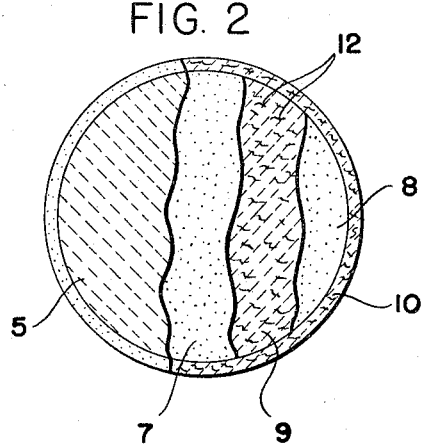
FIGURE 2 is a section on the broken line 2—2 of FIGURE 1.

FIGURE 1 shows the two cylindrical dry porcelain articles 5 and 6, each coated with a membrane 7, 8 of polyvinyl alcohol with the dried slip bond 9 between them. (The thickness of the polyvinyl alcohol membranes 7 and 8, and slip bond 9 are exaggerated to better illustrate the structure.) The drawing indicates that moisture from the slip has penetrated through the polyvinyl alcohol membranes and into the bonding surfaces to insure a strong bond. The collar 10 is formed after the polyvinyl alcohol and bond 9 have partially dried. Fibers 12 in both the slip and the collar are exaggerated in size.

Although the drawing shows cylinders with a collar on the outside thereof, when they are hollow there is a similar collar, similarly formed, over the inner edge of the bond 9 and adjacent inside surfaces of the articles 5 and 6.

Figure 3:
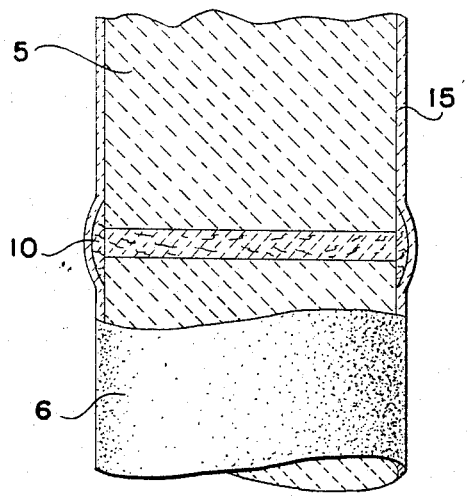
FIGURE 3 is a view of one form of glazed product, partly in section.
Figure 4:
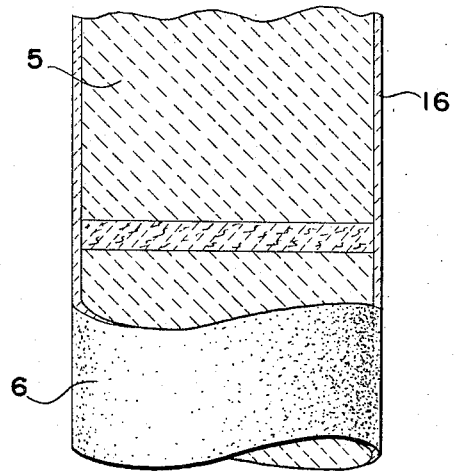
FIGURE 4 is a view of another form of glazed product, partly in section.

The glaze 15 can be applied over the collar 10 (FIGURE 3) or the collar may be first machined away (FIGURE 4) before applying the glaze 16. As usual, the glaze is applied before firing.

The process may be used for bonding a peculiarly shaped dry article to an already dry article to produce a shape that is not attainable by the usual turning process. Also a damaged dry article may be patched by the described technique.

The invention is covered in the claims which follow.

What I claim is:

1. In the process of forming a porcelain article by bonding two dry unfired porcelain articles with mating surfaces, the steps which include applying to each of said articles at the mating surfaces thereof a dry-body-penetrating, water-permeable membrane material which is decomposable to ash at firing temperature, and then uniting said membrane-covered surfaces with an aqueous slip composed essentially of a ceramic bond-forming composition approaching that of said articles, the membrane material preventing absorption of water from the slip by the articles, and thereafter drying and firing the bonded product whereby the membrane is decomposed and said articles and slip are converted into an integral porcelain article.

2. The process of claim 1 in which the membrane is polyvinyl alcohol.

3. The process of claim 1 in which the slip includes small fibers of refractory ceramic material which bond with the solids in the slip on firing without losing their fibrous structure.

4. The process of claim 1 in which before firing, the bond and the edges of the bodies adjacent the mating surfaces are covered with a collar of ceramic bond-forming composition approaching that of said articles.

5. The processs of bonding two dry unfired porcelain articles with a ceramic bond-forming composition, said articles having mating surfaces, which process comprises covering the mating surfaces with a thin coating of a polyvinyl alcohol, uniting said surfaces with a bond of a slip of ceramic bond-forming composition approaching that of said articles which slip contains small refractory ceramic fibers, partially drying, surrounding the bond and adjacent edges of said articles with a collar composed essentially of ceramic bond-forming composition approaching that of said articles and firing.

6. The process of bonding dry unfired porcelain articles with a ceramic bond-forming composition having mating surfaces each covered with a water-permeable membrane which is decomposable to ash at firing temperature and has penerated its surface which process comprises uniting the membrane-covered surfaces with slip composed essentially of (1) ceramic bond-forming composition approaching that of said articles and (2) small refractory ceramic fibers; and thereafter drying and firing the united articles and thereby decomposing the membranes and forming an integral porcelain article of said articles and the bond.

7. A fired porcelain article which comprises two porcelain article portions with mating surfaces bonded together dry with a porcelain bond which approaches the composition of said portions, and an ash of a membrane between said bond and each portion and penetrating the surface of each of said portions adjacent to the bond.

8. The article of claim 7 which is a cylindrical article.

9. The fired poreclain article of claim 7 in which the ash is ash of polyvinyl alcohol.

10. The fired porcelain article of claim 7 in which there are fibers of refractory ceramic material in the bond.

References Cited

UNITED STATES PATENTS

| | | | |
|---|---|---|---|
| 3,024,145 | 3/1962 | Nickerson | 161—193 X |
| 3,184,370 | 5/1965 | Luks | 161—193 |
| 3,287,476 | 11/1966 | Snyder | 264—60 X |

OTHER REFERENCES

Elvanol (Du Pont) 1959, pp. 32–33.

EARL M. BERGERT, *Primary Examiner.*

T. R. SAVOIE, *Assistant Examiner.*